(12) United States Patent
Hara et al.

(10) Patent No.: US 11,656,190 B2
(45) Date of Patent: May 23, 2023

(54) X-RAY FLUORESCENCE SPECTROMETER

(71) Applicant: RIGAKU CORPORATION, Akishima (JP)

(72) Inventors: Shinya Hara, Takatsuki (JP); Yasujiro Yamada, Takatsuki (JP); Hisashi Homma, Nara (JP)

(73) Assignee: Rigaku Corporation, Tokyo (JP)

(*) Notice: Subject to any disclaimer, the term of this patent is extended or adjusted under 35 U.S.C. 154(b) by 0 days.

(21) Appl. No.: 17/790,384

(22) PCT Filed: Sep. 10, 2021

(86) PCT No.: PCT/JP2021/033363
§ 371 (c)(1),
(2) Date: Jun. 30, 2022

(87) PCT Pub. No.: WO2022/091597
PCT Pub. Date: May 5, 2022

(65) Prior Publication Data
US 2023/0044361 A1 Feb. 9, 2023

(30) Foreign Application Priority Data

Oct. 30, 2020 (JP) .............................. JP2020-182990

(51) Int. Cl.
*G01N 23/223* (2006.01)

(52) U.S. Cl.
CPC ....... *G01N 23/223* (2013.01); *G01N 2223/61* (2013.01); *G01N 2223/633* (2013.01)

(58) Field of Classification Search
CPC ......... G01N 2223/61; G01N 2223/633; G01N 2223/076; G01N 2223/1016;
(Continued)

(56) References Cited

U.S. PATENT DOCUMENTS 7,515,689 B2    4/2009   Baba et al.
7,961,842 B2    6/2011   Kawahara et al.
(Continued)

FOREIGN PATENT DOCUMENTS

CN    101098660 A    1/2008
CN    101151524 A    3/2008
(Continued)

OTHER PUBLICATIONS

International Search Report for PCT/JP2021/033363 dated Nov. 16, 2021 [PCT/ISA/210].
(Continued)

*Primary Examiner* — Don K Wong
(74) *Attorney, Agent, or Firm* — Sughrue Mion, PLLC

(57) ABSTRACT

An X-ray fluorescence spectrometer of the present invention includes: a determination module (21) configured to determine, with respect to every one of measurement lines that correspond to secondary X-rays having intensities to be measured, whether or not a ratio of a theoretical intensity in thin film calculated on the basis of an assumed thickness and known contents of respective components to a theoretical intensity in bulk calculated on the basis of the known contents of the respective components exceeds a predetermined threshold; and a saturation thickness quantification module (23) configured to, according to a positive determination by the determination module (21), calculate a saturation thickness with respect to each of the measurement lines, at which the theoretical intensity saturates, on the basis of the known contents of the respective components and to adopt a largest saturation thickness as a quantitative value of a thickness.

2 Claims, 4 Drawing Sheets

(58) Field of Classification Search
CPC ..... G01N 2223/0766; G01N 2223/345; G01N 2223/507; G01N 23/223; G01N 23/2209; G01N 23/2076; G01N 35/00693; G01N 33/52; G01N 21/6404; G01N 23/22; G01N 2021/6463; G01N 221/6493; G01N 35/00722; G01B 15/02
See application file for complete search history.

(56) References Cited

U.S. PATENT DOCUMENTS

| | | |
|---|---|---|
| 8,515,009 B1 | 8/2013 | Piorek et al. |
| 9,945,796 B2 | 4/2018 | Terashita |
| 10,012,605 B2 | 7/2018 | Yamada et al. |
| 2008/0043900 A1 | 2/2008 | Baba et al. |
| 2009/0041184 A1 | 2/2009 | Kawahara et al. |
| 2010/0189215 A1 | 7/2010 | Grodzins et al. |
| 2013/0202083 A1 | 8/2013 | Piorek et al. |
| 2016/0258887 A1 | 9/2016 | Terashita |
| 2017/0322165 A1 | 11/2017 | Yamada et al. |

FOREIGN PATENT DOCUMENTS

| | | | |
|---|---|---|---|
| CN | 103245683 A | 8/2013 | |
| CN | 105637352 A | 6/2016 | |
| CN | 107076687 A | 8/2017 | |
| CN | 110530912 A | 12/2019 | |
| EP | 2 623 929 A1 | 8/2013 | |
| EP | 3951370 A1 * | 2/2022 | ............. G01B 15/02 |
| JP | 04-118509 A | 4/1992 | |
| JP | 10-221047 A | 8/1998 | |
| JP | 2001-304843 A | 10/2001 | |
| JP | 2004-004102 A | 1/2004 | |
| JP | 2008-057977 A | 3/2008 | |
| WO | 2017/026200 A1 | 2/2017 | |

OTHER PUBLICATIONS

Written Opinion of the International Search Authority for PCT/JP2021/033363 dated Nov. 16, 2021 [PCT/ISA/237].
Supplementary European Search Report dated Jan. 3, 2023 in European Application No. 21885716.7.
Office Action dated Feb. 28, 2023 in Japanese Application No. 2020-182990.

* cited by examiner

X-RAY FLUORESCENCE SPECTROMETER

CROSS REFERENCE TO THE RELATED APPLICATION

This application is a National Stage of International Application No. PCT/JP2021/033363 filed Sep. 10, 2021, based on and claims Convention priority to Japanese patent application No. 2020-182990, filed Oct. 30, 2020, the entire disclosure of which is herein incorporated by reference as a part of this application.

BACKGROUND OF THE INVENTION

Field of the Invention

The present invention relates to an X-ray fluorescence spectrometer configured to irradiate a sample with primary X-rays, the sample including a single thin film having a thickness to be measured, to determine a quantitative value of the thickness of the thin film on the basis of measured intensities of generated secondary X-rays by the fundamental parameter method.

Description of Related Art

For example, Patent Document 1 describes an X-ray fluorescence spectrometer that irradiates a sample including a thin film with primary X-rays to determine a quantitative value of a thickness of the thin film on the basis of measured intensities of generated secondary X-rays by the fundamental parameter method (hereinafter, also referred to as the FP method). As used herein, determining a quantitative value(s) of a composition and/or a thickness of the thin film on the basis of measured intensities by the FP method is intended to mean (i) calculating theoretical intensities of the secondary X-rays (measurement lines) generated from the sample excited by the primary X-rays on the basis of an assumed composition and/or an assumed thickness of the thin film constituting the sample and then (ii) recalculating, by iterative approximation, the assumed composition and/or the assumed thickness of the thin film such that the theoretical intensities coincide with converted measured intensities which are obtained by converting the measured intensities of the sample to a theoretical intensity scale, to determine the quantitative value(s) of the composition and/or the thickness.

In general, in the case where quantitative values of a composition in bulk are determined by the FP method, contents (mass fractions) of respective components are used to represent the composition. In this case, intensities of respective measurement lines depend on the contents of the corresponding components, which makes it possible to determine the quantitative values of the composition, but not a quantitative value of the thickness. In the case of a thin film, on the other hand, coating amounts (masses per unit area) of respective components are used to represent the composition. In this case, intensities of respective measurement lines depend on the coating amounts of the corresponding components, which makes it possible to determine a quantitative value of the thickness of the thin film as far as the intensities of the measurement lines change in accordance with changes in the thickness of the thin film.

Related Document

Patent Document

[Patent Document 1] International Publication No. 2017/026200

SUMMARY OF THE INVENTION

In the case where a quantitative value of a thickness of a thin film is determined by the FP method, however, an assumed thickness or assumed coating amounts of respective components cannot be updated when intensities of measurement lines no longer change in spite of changes in the thickness of the thin film with respect to all the measurement lines during recalculation by iterative approximation. Accordingly, the quantitative calculation cannot be continued and is ended with an error indication notifying as such, without determining the quantitative value of the thickness.

In view of the conventional problem, an object of the present invention is to provide an X-ray fluorescence spectrometer that determines a quantitative value of a thickness of a thin film by the FP method, the spectrometer being capable of appropriately providing the quantitative value of the thickness, without giving an error even when intensities of measurement lines no longer change in accordance with changes in the thickness of the thin film with respect to all the measurement lines during the quantitative calculation.

In order to achieve the above object, a first aspect of the present invention is an X-ray fluorescence spectrometer configured to irradiate a sample with primary X-rays, the sample including a single thin film which contains respective components in known contents and has a thickness to be measured, to determine a quantitative value of the thickness of the thin film on the basis of measured intensities of generated secondary X-rays by the fundamental parameter method, the X-ray fluorescence spectrometer including a determination module and a saturation thickness quantification module.

The determination module is configured to determine, with respect to every one of measurement lines that correspond to the secondary X-rays having intensities to be measured, whether or not a ratio of a theoretical intensity in thin film calculated on the basis of an assumed thickness and the known contents of the respective components to a theoretical intensity in bulk calculated on the basis of the known contents of the respective components exceeds a predetermined threshold.

The saturation thickness quantification module is configured to, when the determination module has determined that the ratio of the theoretical intensities has exceeded the predetermined threshold with respect to every one of the measurement lines, calculate a saturation thickness with respect to each of the measurement lines, at which the theoretical intensity saturates, on the basis of the known contents of the respective components and to adopt a largest saturation thickness as the quantitative value of the thickness.

In the X-ray fluorescence spectrometer of the first aspect, the determination module determines that the intensities of the measurement lines no longer change in spite of changes in the thickness of the thin film with respect to all the measurement lines during the quantitative calculation if that happens, and the saturation thickness quantification module adopts a largest saturation thickness of the saturation thicknesses with respect to all the measurement lines as the quantitative value of the thickness. Thus, even when the intensities of the measurement lines no longer change in accordance with changes in the thickness of the thin film with respect to all the measurement lines during the quantitative calculation, the spectrometer can appropriately provide the quantitative value of the thickness without giving an error.

A second aspect of the present invention is an X-ray fluorescence spectrometer configured to irradiate a sample with primary X-rays, the sample including a single thin film which contains respective components in coating amounts to be measured and has a thickness to be measured, to determine quantitative values of the coating amounts of the respective components in the thin film and a quantitative value of the thickness of the thin film on the basis of measured intensities of generated secondary X-rays by the fundamental parameter method, the X-ray fluorescence spectrometer including a determination module, a sample model change module, and a saturation thickness quantification module.

The determination module is configured to determine, with respect to every one of measurement lines that correspond to the secondary X-rays having intensities to be measured, whether or not a ratio of a theoretical intensity in thin film calculated on the basis of assumed coating amounts of the respective components to a theoretical intensity in bulk calculated on the basis of a ratio of the assumed coating amount of the corresponding component to a total coating amount exceeds a predetermined threshold.

The sample model change module is configured to, when the determination module has determined that the ratio of the theoretical intensities has exceeded the predetermined threshold with respect to every one of the measurement lines, switch a calculation method so as to treat the thin film as a bulk and determine quantitative values of contents of the respective components.

Further, the saturation thickness quantification module is configured to calculate a saturation thickness with respect to each of the measurement lines, at which the theoretical intensity saturates, on the basis of the contents of the respective components calculated after switching by the sample model change module and to adopt a largest saturation thickness as the quantitative value of the thickness.

In the X-ray fluorescence spectrometer of the second aspect, the determination module determines that the intensities of the measurement lines no longer change in spite of changes in the thickness of the thin film with respect to all the measurement lines during the quantitative calculation if that happens; the sample model change module switches a calculation method so as to treat the thin film as a bulk and determine the quantitative values of the contents of the respective components; and the saturation thickness quantification module adopts a largest saturation thickness of the saturation thicknesses with respect to all the measurement lines as the quantitative value of the thickness. Thus, even when the intensities of the measurement lines no longer change in accordance with changes in the thickness of the thin film with respect to all the measurement lines during the quantitative calculation, the spectrometer can appropriately provide the quantitative value of the thickness without giving an error.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures, FIG. 1 schematically shows an X-ray fluorescence spectrometer according to a first embodiment of the present invention;

DESCRIPTION OF THE EMBODIMENTS

Figure 1:
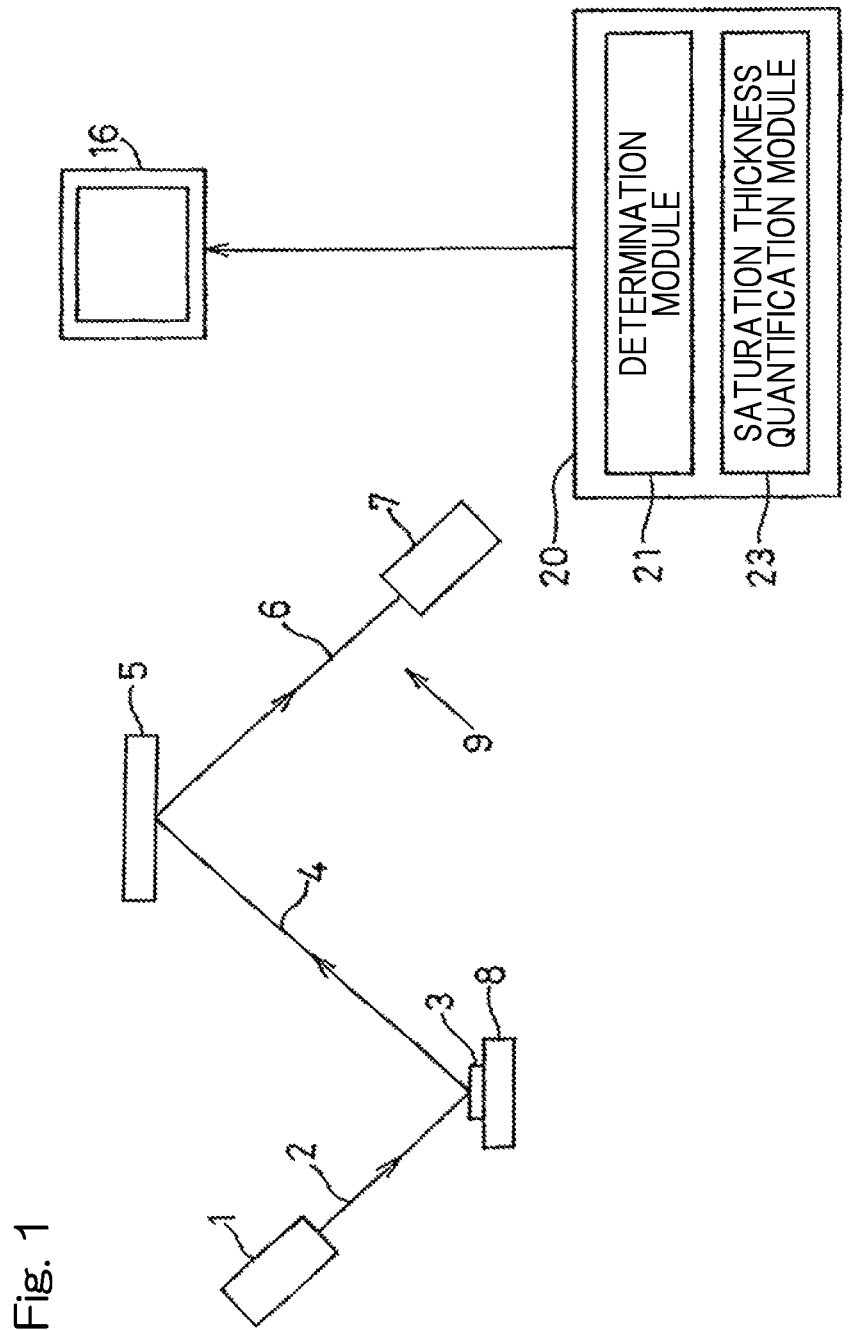

Hereinafter, an X-ray fluorescence spectrometer of a first embodiment of the present invention will be described with reference to the drawings. As shown in FIG. 1, the X-ray fluorescence spectrometer irradiates a sample 3 with primary X-rays 2 from an X-ray source 1 such as an X-ray tube, the sample including a single thin film which contains respective components in known contents and has a thickness to be measured, to measure intensities of generated secondary X-rays 4 by using a detection module 9 and determine a quantitative value of the thickness of the thin film on the basis of the measured intensities by the fundamental parameter method, and the X-ray fluorescence spectrometer includes a determination module 21 and a saturation thickness quantification module 23.

The sample 3 herein is a so-called thin film sample, e.g., a gold-plated brass plate, and is placed on sample stage 8. The detection module 9 includes: a spectroscopic device 5 that monochromates the secondary X-rays 4 such as fluorescent X-rays generated from the sample 3; and a detector 7 that measures an intensity of each of the monochromated secondary X-rays 6. A high energy resolution detector may be used as a detection module, without using a spectroscopic device 5. The determination module 21 and the saturation thickness quantification module 23 are included as programs in a quantification device 20 such as a computer.

As used herein, determining a quantitative value of the thickness of the thin film on the basis of measured intensities by the FP method is intended to mean (i) calculating theoretical intensities of the secondary X-rays 4 generated from the sample 3 excited by the primary X-rays 2 from coating amounts of the respective components calculated on the basis of an assumed thickness of the single thin film and known contents of respective components in the single thin film of the sample 3 and then (ii) recalculating, by iterative approximation, the assumed thickness of the thin film such that the theoretical intensities coincide with converted measured intensities which are obtained by converting the measured intensities of the sample 3 to a theoretical intensity scale, with a predetermined convergence condition satisfied, to determine a quantitative value of the thickness.

The determination module 21 of the X-ray fluorescence spectrometer of the first embodiment determines, with respect to every one of measurement lines that correspond to the secondary X-rays having intensities to be measured, whether or not a ratio of a theoretical intensity in thin film calculated on the basis of an assumed thickness and the known contents of the respective components to a theoretical intensity in bulk calculated on the basis of the known contents of the respective components exceeds a predetermined threshold. When the determination module 21 has determined that the ratio of the theoretical intensities has exceeded the predetermined threshold with respect to every one of the measurement lines, the saturation thickness quantification module 23 calculates a saturation thickness with respect to each of the measurement lines, at which the theoretical intensity saturates, on the basis of the known contents of the respective components and adopts a largest saturation thickness as the quantitative value of the thickness.

Figure 3:
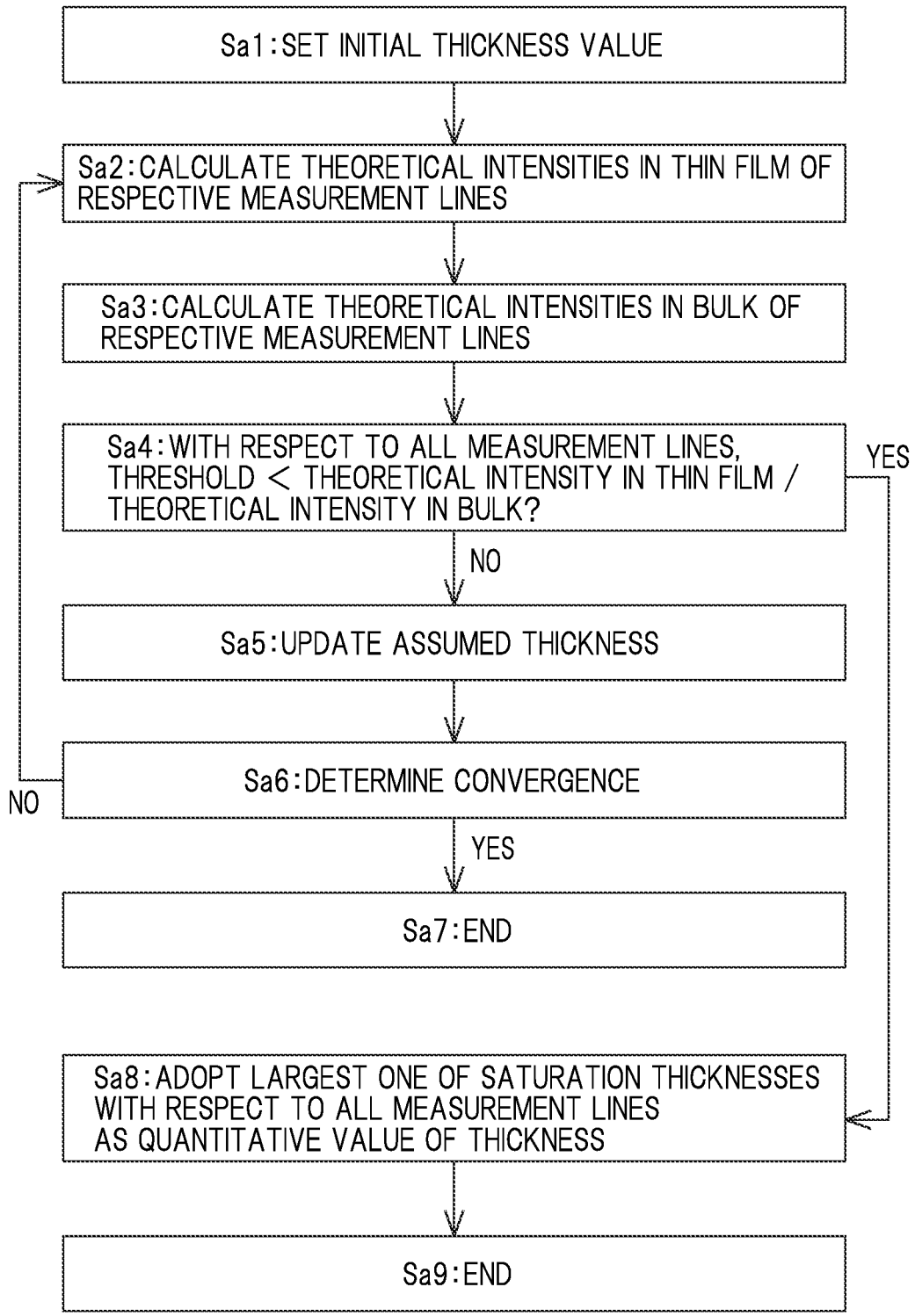
FIG. 3 is a flowchart representing an operation of the X-ray fluorescence spectrometer of the first embodiment.

In particular, the quantification device 20 including the determination module 21 and the saturation thickness quantification module 23 operates as shown in the flowchart of FIG. 3. It should be noted that, of the following steps, step Sa3 and step Sa4 are operations carried out by the determination module 21; step Sa8 and step Sa9 are operations carried out by the saturation thickness quantification module 23; and the rest of the steps are operations of the known FP method carried out by the quantification device 20. Although omitted in the figure, there are also steps before step Sa1 for, e.g., obtaining the measured intensities and converting them to the theoretical intensity scale to calculate the converted measured intensities, as operations of the known FP method.

First, in step Sa1, a sufficiently small arbitrary value is set (assumed) as an initial thickness value. Next, in step Sa2, a theoretical intensity in thin film is calculated for each of the measurement lines from coating amounts of the respective components calculated on the basis of the assumed thickness and the known contents of the respective components. Then, in step Sa3, a theoretical intensity in bulk is calculated for each of the measurement lines on the basis of the known contents of the respective components. More specifically, the theoretical intensities in bulk of the respective measurement lines are adopted when changes in all the theoretical intensities fall below. e.g., 1% during repeated calculations of the theoretical intensities for all the measurement lines from the coating amounts of the respective components, with the thickness increased, e.g., tenfold each time starting from the sufficiently small arbitrary value and the known contents of the respective components kept constant.

Next, in step Sa4, with respect to every one of the measurement lines, it is determined whether or not the ratio of the theoretical intensity in thin film to the theoretical intensity in bulk exceeds the predetermined threshold (for example, 0.99). If the determination is No, the process proceeds to step Sa5; if the determination is Yes, the process proceeds to step Sa8.

In step Sa5, the assumed thickness is recalculated such that the theoretical intensity in thin film coincides with the converted measured intensity for each of the measurement lines, and the assumed thickness is updated. In subsequent step Sa6, convergence is determined on the basis of the assumed thicknesses before and after the update and a predetermined convergence condition. If the determination is Yes, the process proceeds to step Sa7 to end the quantitative calculation, and the latest assumed thickness is displayed as the quantitative value of the thickness on a display unit 16 such as a liquid crystal display. If the determination is No, the process returns to step Sa2.

In step Sa8, on the other hand, a saturation thickness at which the theoretical intensity saturates is calculated for each of the measurement lines on the basis of the known contents of the respective components, and a largest saturation thickness is adopted as the quantitative value of the thickness. More specifically, the saturation thickness for a measurement line is adopted when a change in the theoretical intensity of that measurement line falls below, e.g., 1% during repeated calculations of the theoretical intensities for all the measurement lines from the coating amounts of the respective components, with the thickness increased, e.g., tenfold each time starting from the sufficiently small arbitrary value and the known contents of the respective components kept constant. Then, a largest saturation thickness of the saturation thicknesses with respect to all the measurement lines is adopted as the quantitative value of the thickness, and the display unit 16 displays that the actual thickness of the thin film exceeds the quantitative value of the thickness. Next, the process proceeds to step Sa9 to end the quantitative calculation.

As described above, in the X-ray fluorescence spectrometer of the first embodiment, the determination module 21 determines that the intensities of the measurement lines no longer change in spite of changes in the thickness of the thin film with respect to all the measurement lines during the quantitative calculation if that happens, and the saturation thickness quantification module 23 adopts a largest saturation thickness of the saturation thicknesses with respect to all the measurement lines as the quantitative value of the thickness. Thus, even when the intensities of the measurement lines no longer change in accordance with changes in the thickness of the thin film with respect to all the measurement lines during the quantitative calculation, the spectrometer can appropriately provide the quantitative value of the thickness without giving an error.

Figure 2:
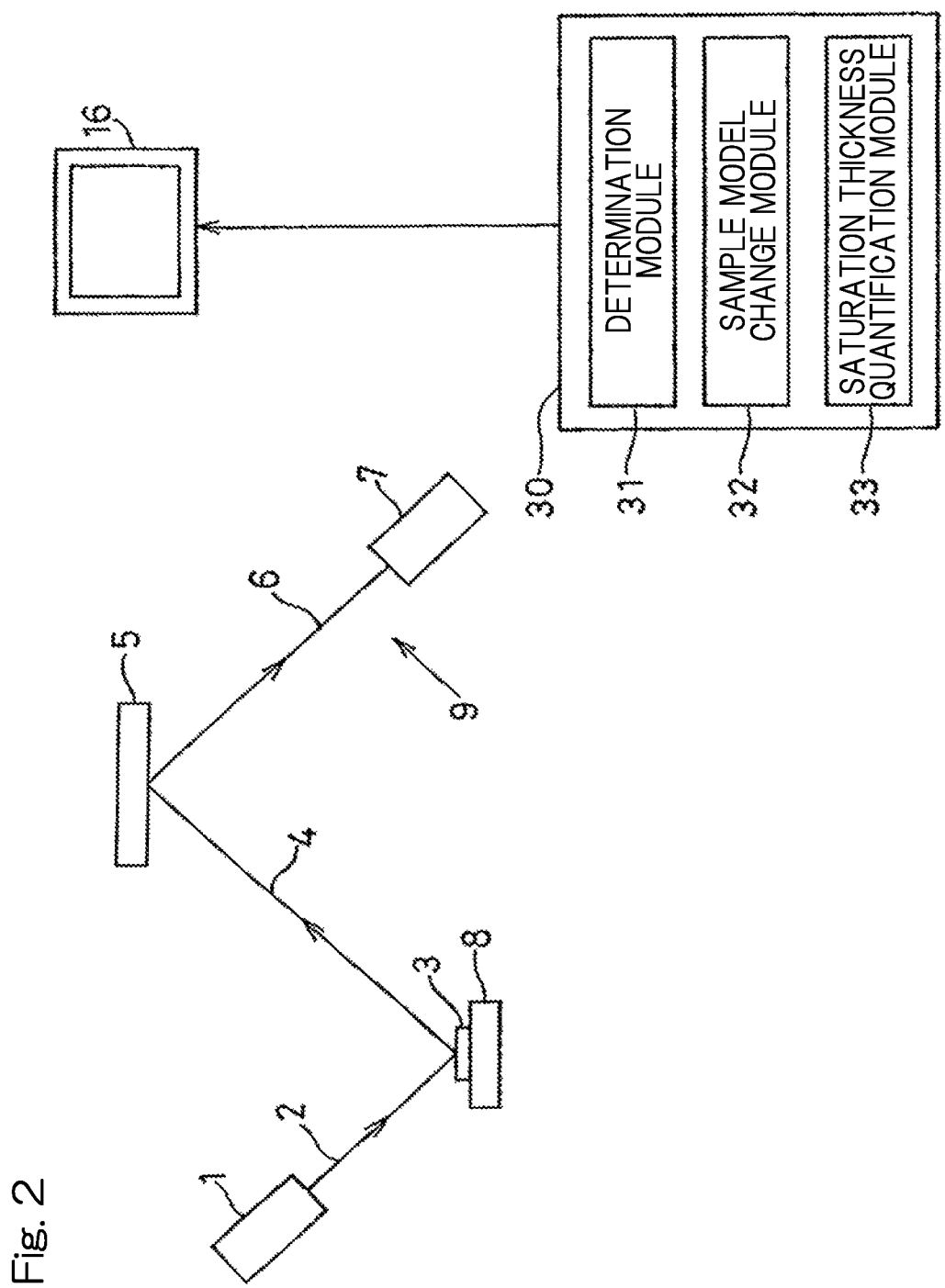
FIG. 2 schematically shows an X-ray fluorescence spectrometer according to a second embodiment of the present invention.

Next, an X-ray fluorescence spectrometer of a second embodiment of the present invention will be described. As shown in FIG. 2, the X-ray fluorescence spectrometer irradiates a sample 3 with primary X-rays 2 from an X-ray source 1 such as an X-ray tube, the sample including a single thin film which contains respective components in coating amounts to be measured and has a thickness to be measured, to measure intensities of generated secondary X-rays 4 by using a detection module 9 and determine quantitative values of the coating amounts of the respective components in the thin film and a quantitative value of the thickness of the thin film on the basis of the measured intensities by the fundamental parameter method, and the X-ray fluorescence spectrometer includes a determination module 31, a sample model change module 32, and a saturation thickness quantification module 33. The determination module 31, the sample model change module 32, and the saturation thickness quantification module 33 are included as programs in a quantification device 30 such as a computer.

As used herein, determining quantitative values of the coating amounts of the respective components in the thin film and a quantitative value of the thickness of the thin film on the basis of the measured intensities by the FP method is intended to mean (i) calculating theoretical intensities of the secondary X-rays 4 generated from the sample 3 excited by the primary X-rays 2 from assumed coating amounts of the respective components in the single thin film of the sample 3 and then (ii) recalculating, by iterative approximation, the assumed coating amounts of the respective components in the thin film such that the theoretical intensities coincide with converted measured intensities which are obtained by converting the measured intensities of the sample 3 to a theoretical intensity scale, with a predetermined convergence condition satisfied, to determine quantitative values of the coating amounts of the respective components and a quantitative value of the thickness.

The determination module 31 of the X-ray fluorescence spectrometer of the second embodiment determines, with respect to every one of measurement lines that correspond to the secondary X-rays having intensities to be measured, whether or not a ratio of a theoretical intensity in thin film calculated on the basis of assumed coating amounts of the respective components to a theoretical intensity in bulk calculated on the basis of a ratio of the assumed coating amount of the corresponding component to a total coating amount exceeds a predetermined threshold. When the determination module 31 has determined that the ratio of the theoretical intensities has exceeded the predetermined threshold with respect to every one of the measurement lines, the sample model change module 32 switches a calculation method so as to treat the thin film as a bulk and determine quantitative values of the contents of the respective components. Further, the saturation thickness quantification module 33 calculates a saturation thickness with respect to each of the measurement lines, at which the theoretical intensity saturates, on the basis of the contents of the respective components calculated after switching by the sample model change module 32 and to adopt a largest saturation thickness as the quantitative value of the thickness.

Figure 4:
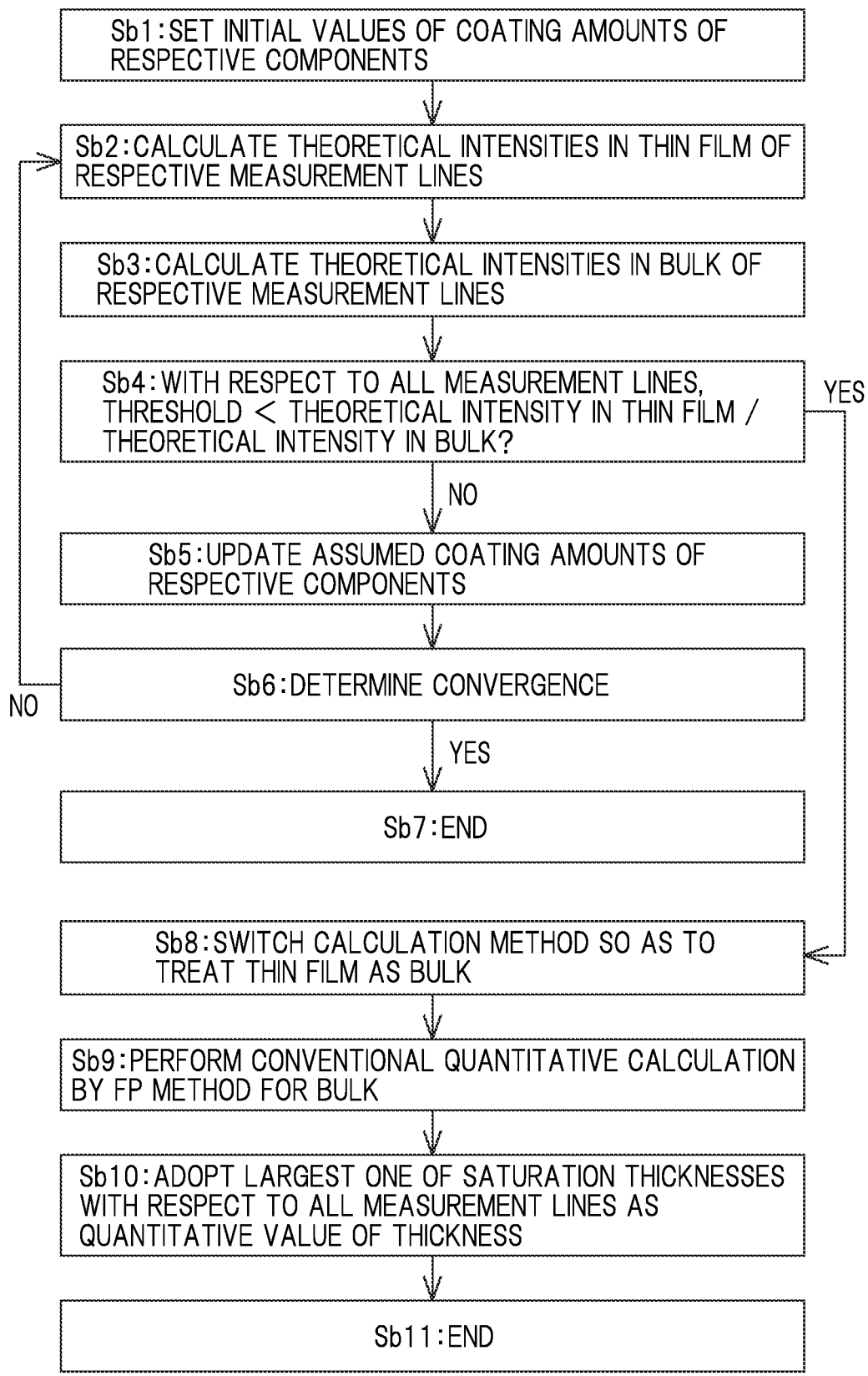
FIG. 4 is a flowchart representing an operation of the X-ray fluorescence spectrometer of the second embodiment.

In particular, the quantification device 30 including the determination module 31, the sample model change module 32, and the saturation thickness quantification module 33 operates as shown in the flowchart of FIG. 4. It should be noted that, of the following steps, step Sb3 and step Sb4 are operations carried out by the determination module 31; step Sb8 is an operation carried out by the sample model change module 32; step Sb10 is an operation carried out by the saturation thickness quantification module 33; and the rest of the steps are operations of the known FP method carried out by the quantification device 30. Although omitted in the figure, there are also steps before step Sb1 for, e.g., obtaining the measured intensities and converting them to the theoretical intensity scale to calculate the converted measured intensities, as operations of the known FP method.

First, in step Sb1, an initial value of a coating amount of each component is set (assumed), which is calculated from a converted measured intensity of a corresponding measurement line. Next, in step Sb2, a theoretical intensity in thin film is calculated for each of the measurement lines from the assumed coating amounts of the respective components. Then, in step Sb3, a theoretical intensity in bulk is calculated for each of the measurement lines on the basis of a ratio of the assumed coating amount of the corresponding component to a total coating amount. More specifically, the theoretical intensities in bulk of the respective measurement lines are adopted when changes in all the theoretical intensities fall below, e.g., 1% during repeated calculations of the theoretical intensities for all the measurement lines from the coating amounts of the respective components, with the thickness increased. e.g., tenfold each time starting from a sufficiently small arbitrary value and the ratio of the assumed coating amount of each component to the total coating amount kept constant.

Next, in step Sb4, with respect to every one of the measurement lines, it is determined whether or not the ratio of the theoretical intensity in thin film to the theoretical intensity in bulk exceeds the predetermined threshold (for example, 0.99). If the determination is No, the process proceeds to step Sb5; if the determination is Yes, the process proceeds to step Sb8.

In step Sb5, the assumed coating amount of each component is recalculated such that the theoretical intensity in thin film coincides with the converted measured intensity for each of the measurement lines, and the assumed coating amount is updated. In subsequent step Sb6, convergence is determined on the basis of the assumed coating amounts of each component before and after the update and a predetermined convergence condition. If the determination is Yes, the process proceeds to step Sb7 to end the quantitative calculation, and the latest assumed coating amounts of the respective components and a thickness calculated therefrom are displayed on a display unit 16 as the quantitative values of the coating amounts of the respective components and the quantitative value of the thickness. If the determination is No, the process returns to step Sb2.

In step Sb8, on the other hand, a calculation method is switched so as to treat the thin film as a bulk and determine the quantitative values of the contents of the respective components. Then, the process proceeds to step Sb9, and the quantitative values of the contents of the respective components are determined by conventional quantitative calculation by the FP method for the case of bulk.

Next, in step Sb10, a saturation thickness is calculated for each of the measurement lines, at which the theoretical intensity saturates, on the basis of the contents of the respective components calculated in step Sb9, and a largest saturation thickness is adopted as the quantitative value of the thickness. More specifically, the saturation thickness for a measurement line is adopted when a change in the theoretical intensity of that measurement line falls below, e.g., 1% during repeated calculations of the theoretical intensities for all the measurement lines from the coating amounts of the respective components, with the thickness increased, e.g., tenfold each time starting from a sufficiently small arbitrary value and the calculated contents of the respective components in step Sb9 kept constant. Then, a largest saturation thickness of the saturation thicknesses with respect to all the measurement lines is adopted as the quantitative value of the thickness, and the display unit 16 displays that the actual thickness of the thin film exceeds the quantitative value of the thickness. Next, the process proceeds to step Sb11 to end the quantitative calculation, and the display unit 16 displays the quantitative values of the contents of the respective components calculated in step Sb9.

As described above, in the X-ray fluorescence spectrometer of the second embodiment, the determination module 31 determines that the intensities of the measurement lines no longer change in spite of changes in the thickness of the thin film with respect to all the measurement lines during the quantitative calculation if that happens; the sample model change module 32 switches a calculation method so as to treat the thin film as a bulk and determine the quantitative values of the contents of the respective components; and the saturation thickness quantification module 33 adopts a largest saturation thickness of the saturation thicknesses with respect to all the measurement lines as the quantitative value of the thickness. Thus, even when the intensities of the measurement lines no longer change in accordance with changes in the thickness of the thin film with respect to all the measurement lines during the quantitative calculation, the spectrometer can appropriately provide the quantitative value of the thickness without giving an error.

Although the present invention has been described in terms of the preferred examples thereof with reference to the drawings, those skilled in the art would readily arrive at various changes and modifications in view of the present specification without departing from the scope of the invention. Accordingly, such changes and modifications are included within the scope of the present invention defined by the appended claims.

REFERENCE NUMERALS

2 . . . primary X-rays
3 . . . sample
4 . . . secondary X-rays (measurement lines)
21, 31 . . . determination module
23, 33 . . . saturation thickness quantification module
32 . . . sample model change module

What is claimed is:

1. An X-ray fluorescence spectrometer configured to irradiate a sample with primary X-rays, the sample including a single thin film which contains respective components in known contents and has a thickness to be measured, to determine a quantitative value of the thickness of the thin film on the basis of measured intensities of generated secondary X-rays by fundamental parameter method, the X-ray fluorescence spectrometer comprising:

a determination module configured to determine, with respect to every one of measurement lines that correspond to the secondary X-rays having intensities to be measured, whether or not a ratio of a theoretical intensity in thin film calculated on the basis of an assumed thickness and the known contents of the respective components to a theoretical intensity in bulk calculated on the basis of the known contents of the respective components exceeds a predetermined threshold; and a saturation thickness quantification module configured to, when the determination module has determined that the ratio of the theoretical intensities has exceeded the predetermined threshold with respect to every one of the measurement lines, calculate a saturation thickness with respect to each of the measurement lines, at which the theoretical intensity saturates, on the basis of the known contents of the respective components and to adopt a largest saturation thickness as the quantitative value of the thickness.

2. An X-ray fluorescence spectrometer configured to irradiate a sample with primary X-rays, the sample including a single thin film which contains respective components in coating amounts to be measured and has a thickness to be measured, to determine quantitative values of the coating amounts of the respective components in the thin film and a quantitative value of the thickness of the thin film on the basis of measured intensities of generated secondary X-rays by fundamental parameter method, the X-ray fluorescence spectrometer comprising:

a determination module configured to determine, with respect to every one of measurement lines that correspond to the secondary X-rays having intensities to be measured, whether or not a ratio of a theoretical intensity in thin film calculated on the basis of assumed coating amounts of the respective components to a theoretical intensity in bulk calculated on the basis of a ratio of the assumed coating amount of the corresponding component to a total coating amount exceeds a predetermined threshold;

a sample model change module configured to, when the determination module has determined that the ratio of the theoretical intensities has exceeded the predetermined threshold with respect to every one of the measurement lines, switch a calculation method so as to treat the thin film as a bulk and determine quantitative values of contents of the respective components; and a saturation thickness quantification module configured to calculate a saturation thickness with respect to each of the measurement lines, at which the theoretical intensity saturates, on the basis of the contents of the respective components calculated after switching by the sample model change module and to adopt a largest saturation thickness as the quantitative value of the thickness.

* * * * *